United States Patent [19]

Andrews et al.

[11] 3,923,974

[45] Dec. 2, 1975

[54] SOLID FINE CRYSTALLINE PARACETAMOL POLYMER COMPLEX COMPOSITION

[75] Inventors: Roderic Stafford Andrews; Christoper George Barlow; John Lewis Livingstone, all of Newcastle-upon-Tyne, England

[73] Assignee: Sterling Drug Inc., New York, N.Y.

[22] Filed: Apr. 29, 1974

[21] Appl. No.: 465,159

Related U.S. Application Data

[62] Division of Ser. No. 353,631, April 23, 1973, Pat. No. 3,851,032.

[52] U.S. Cl. ................................. 424/80
[51] Int. Cl.² ........................................ A61K 31/79
[58] Field of Search ........................................ 424/80

[56] References Cited
UNITED STATES PATENTS

| | | | |
|---|---|---|---|
| 2,667,473 | 1/1954 | Morner et al. | 260/85.7 |
| 3,851,032 | 11/1974 | Andrews et al. | 424/80 |

FOREIGN PATENTS OR APPLICATIONS

| | | |
|---|---|---|
| 1,287,431 | 8/1972 | United Kingdom |

OTHER PUBLICATIONS

Haleblian et al., J. Pharm. Sci. 58(8): 911–929, Aug. 1969, "Pharmacoutical Applications of Polymorphism".

*Primary Examiner*—Shep K. Rose
*Attorney, Agent, or Firm*—Robert K. Bair; B. Woodrow Wyatt

[57] ABSTRACT

One aspect of the invention is a method of preparing a composition which is suitable for direct tablet compression and which comprises crystals containing a mixture of paracetamol and a polymer, said method which comprises providing a hot aqueous solution containing paracetamol and from 1 to 15%, by weight on the weight of the paracetamol, of a polymer selected from homopolymers and copolymers of vinyl acetate and vinyl pyrrolidone, cooling said solution with gentle stirring and recovering said composition.

Preferred compositions are obtained using the polymer in an amount from 2 to 6% by weight on the weight of the paracetamol and using as the polymer a copolymer of vinyl pyrrolidone and vinyl acetate in a weight ratio of from 70:30 to 50:50. The composition is preferably dried to a moisture level of from 0.4 to 1.4% by weight. Another aspect of the invention is the said composition of paracetamol and polymer, a preferred embodiment containing from 1.5 to 5% by weight of a copolymer of vinyl pyrrolidone and vinyl acetate in a weight ratio of from 70:30 to 50:50. Still another aspect of the invention is the tablet formed by direct tablet compression of said composition.

4 Claims, No Drawings

3,923,974

SOLID FINE CRYSTALLINE PARACETAMOL POLYMER COMPLEX COMPOSITION

This application is a division of copending application Ser. No. 353,631, filed Apr. 23, 1973 and now U.S. Pat. No. 3,851,032, issued Nov. 26, 1974.

This invention relates to compositions containing paracetamol which are suitable for direct tablet compressions. Paracetamol is a well established general-purpose analgesic, and is normally supplied in tablets containing 500 mg of active material. The bulk volume of this material alone is close to the normally acceptable limit of size for tablets, and it is therefore desirable to minimise any additions of other materials for tabletting purposes.

In the pharmaceutical industry, it is a well-known fact that very few crystalline or powdered materials can be compressed into suitable tablets on automatic tabletting equipment in their original crystalline or powdered form. The practice has developed of first preparing a granulation of the material, because it is known that the granular structure thus formed is suitable for compression into tablets.

It has hitherto been the practice to granulate paracetamol prior to tabletting by moistening the dry powder with or without the addition of an adhesive substance until the whole is converted into a crumbling mass. The mass is then forced through a screen to reduce the material to small compressed granules. This granulation process is undesirable in that it is an extra step and adds to the cost of the final product; also the process is difficult to control and is liable to cause variations in the quality of the product. More importantly, where paracetamol is manufactured by one company, and then sold to another for tabletting, it is obviously desirable for the manufacturing company to be able to offer the tabletting company a composition which can be tabletted by direct compression.

British Patent Specification No. 1,287,431 sets out to avoid the disadvantages of wet granulation by providing a process for converting paracetamol into a form suitable for direct tablet compression by forming a slurry containing discrete particles of paracetamol and from 2 to 5% of a binding agent, and spray drying the slurry. This process is simpler than, and hence an improvement over, the conventional wet granulation process, but the slurrying and spray drying are nevertheless expensive extra steps in the production of paracetamol tablets. That there is a need for a less elaborate technique for making paracetamol tablets, can be seen from the following tabular comparison, which starts in each case with aqueous paracetamol solution (the form in which paracetamol is first obtained).

| Wet granulation | Spray Drying | Crystallization |
| --- | --- | --- |
| (conventional) | (BP 1287431) | (this invention) |
| Crystallise | Crystallise | Crystallise with polymer |
| Dry | Dry | Dry |
| Grind | Grind | Blend |
| Blend | Slurry with binder | Compress |
| Wet with binder | Spray dry | |
| Wet granulate | Blend | |
| Dry | Compress | |
| Break down | | |
| Mix with lubricant | | |
| Compress | | |

There are two aspects of the present invention. In the first, the invention provides a method of preparing a composition containing paracetamol which is suitable for direct tablet compression, and which does not, or at least need not, involve any manufacturing step other than those normally used to prepare crystalline paracetamol. In the other aspect, the invention provides a composition containing paracetamol which is suitable for direct tablet compression but which has not been subjected to the conventional granulation process.

According to the first aspect therefore, this invention provides a method of preparing a composition containing paracetamol which is suitable for direct tablet compression, which method comprises providing a hot aqueous solution of paracetamol, containing from 1 to 15%, by weight on the weight of the paracetamol, of a polymer selected from homopolymers and copolymers of vinyl acetate and vinyl pyrrolidone dissolved in said hot aqueous solution, and then cooling this solution with gentle stirring and recovering the solid therefrom.

According to the second aspect of the invention, the novel product may be characterised as a composition which is suitable for direct tablet compression and which comprises crystals containing a mixture of paracetamol and a polymer selected from homopolymers and copolymers of vinyl acetate and vinyl pyrrolidone, the polymer being present in an amount of from 1 to 15%, by weight on the weight of the paracetamol, and being distributed throughout each crystal.

Paracetamol is conventionally first obtained as a hot aqueous solution. The polymer is preferably added as a solution to the paracetamol solution. This polymer solution is conveniently aqueous, although aqueous alcoholic solutions may also be used, and the solution may be added to the paracetamol solution either hot or cold. The paracetamol solution is preferably used at a temperature of at least 95°C, particularly about 98°C, because the solubility of paracetamol is quite strongly temperature dependent. When the polymer solution is added cold, the resulting mixture is preferably reheated to at least 95°C, e.g. about 98°C.

We have found that the polymer solution should not be overheated, as if this happens the compression characteristics and physical appearance of the product may be impaired. We suspect that excess heating may cause the polymer to cross-link or to break down. Also, equilibrium dialysis experiments indicate that there is a substantial degree of complex formation between the polymer and the paracetamol in solution, and this may well be affected by overheating.

To avoid excess heating, the polymer (in solution) should desirably be mixed with a hot solution of paracetamol, rather than be mixed with a cold solution of the paracetamol and the entire mixture heated. Where the mixture has to be heated as such, heating should preferably be effected as quickly as possible. Sufficiently rapid heating is readily achieved in the laboratory, but could hardly be possible in operation on a commercial scale.

The solution formed by mixing the polymer with the paracetamol solution should not be maintained at an elevated temperature for longer than is necessary, but should immediately be cooled. As explained above, it may be necessary to reheat the mixed solution, if this has been cooled by addition of a cold solution of the polymer, to ensure that all the paracetamol is initially dissolved, but this reheating is desirably minimised as far as possible.

The rate of cooling does not appear to be critical. In large scale commercial operation, it will doubtless be preferable to hasten cooling artificially by means of a coolant, but we have found on a laboratory scale that perfectly acceptable products can be obtained if the solution is simply allowed to cool. Cooling times of from 30 minutes to 12 hours are likely to be convenient in commercial operation.

Stirring during cooling is necessary to ensure the formation of a large number of small crystals with the correct physical properties. We have unexpectedly found, however, that vigorous or rapid stirring is liable to spoil the physical appearance and compression characteristics of the product. (In particular, we have found that the use of a propeller stirrer is generally unsatisfactory). The reason for this is obscure but may be due to vortex formation. It is nevertheless necessary that the cooling be effected with gentle stirring, for example, manually or by means of a paddle stirrer operated at a low speed.

Under the above conditions, the paracetamol is obtained in the form of crystals which are on average rather smaller than those obtained in the absence of polymer. These smaller crystals have the advantage, over conventional paracetamol crystals, that they do not need to be ground up before compacting. Crystal size and shape do not separately appear to be critical, though a particular distribution of crystal size as well as the form and habit of the crystals may assist in compacting.

The solid may be recovered from the supernatant liquor by any convenient means, for example, by centrifuging or filtering, and may be dried, preferably to a moisture content of from 0.4 to 1.4%, e.g. from 0.8 to 1.0%, by weight, by any convenient means, for example by tray drying in an oven or fluidised bed drying.

The organic polymeric material is a homopolymer or copolymer of vinyl pyrrolidone or vinyl acetate. Preferred are copolymers of vinyl pyrrolidone and vinyl acetate in which the weight ratio of vinyl pyrrolidone to vinyl acetate is from 75:25 to 25:75 and more preferably 70:30 to 50:50, particularly 60:40.

The paracetamol solution generally contains up to 15% by weight, preferably from 2 to 6% by weight, of the organic polymeric material on the weight of the paracetamol. Noticeable improvements in the binding properties are obtained using as little as 1% of the polymer, but superior results are generally obtainable by using 3% or more of the polymer. The upper limits of polymer content are governed more by economic factors than by consideration of improved tabletting properties.

Not all of the polymer becomes associated with the paracetamol crystals. In general, from 60 to 90% of the polymer is recovered in this way, so that a solid composition prepared from a solution containing from 3% of polymer (on the weight of the paracetamol), may contain 2.0 to 2.9% of polymer, or even more if the process is carried out at low paracetamol concentrations which will of course result in a reduced recovery of solid paracetamol. The compositions of this invention contain from 1 to 15%, preferably 1.5 to 5%, of polymer by weight on the weight of the paracetamol. The polymer content may be determined by a sodium hydroxide turbidometric procedure.

Raman spectroscopy, electron microscopy and X-ray crystallographic analyses of the product indicate that the polymer is not exclusively, nor even substantially, on the surface of the crystals. We infer that the polymer is distributed throughout each crystal, and although we do not know the nature of its association with the paracetamol we believe this may be a complex, possibly formed by hydrogen bonding. This inference is supported by the observation that simple dry admixture of crystalline paracetamol with polymer does not improve the tablet-forming properties of the paracetamol. It is surprising that crystallisation of the paracetamol in the presence of the organic polymeric material, according to the process of this invention, alters the physical properties of the paracetamol such that direct tablet compression is possible. We believe that the polymeric material fulfills a dual role, in that it first modifies the crystallisation of the paracetamol, and subsequently affects binding of the crystal agglomerates in the tabletting stage.

Known tabletting additives, for example, lubricants, glidants, disintegrants and surfactants, may be incorporated in the composition. Examples of such known materials are the following:

Lubricants
Magnesium stearate
Stearic acid
Stearyl alcohol
Liquid paraffin
Polyethylene glycols
P.T.F.E.
Glidants
Talc
Colloidal silicic acid
Disintegrants
Starch
Alginic acid and its salts
Modified starches
Certain cellulose derivatives including that sold under the Trade Mark Solkafloc.
Surfactants
Sodium lauryl sulphate.

The additives may be mixed with the solid composition after separation from the crystallisation liquor.

The resulting composition is suitable to be formed into tablets by direct tablet compression, if desired, after simple admixture with conventional tabletting additives, such as those described above.

The following Examples illustrate the invention. Parts and percentages are by weight.

EXAMPLE 1

60 g of a 60:40 Vinylpyrrolidone/vinyl acetate copolymer (GAF S 630) was dissolved in 200 ml of water. To this was added 3500 ml of an aqueous solution of 2 kg of paracetamol at 100°C. The resulting solution was stirred and then cooled. The composition which crystallised out was isolated by filtration and dried in an oven at 60°C to a residual moisture convent of 0.6%.

A tablet mix was prepared from 1000 g of this composition, 20 g of starch, 20 g of Solkafloc and 2.5 g of magnesium stearate. The mix was fed into a Manesty F single punch reciprocating tablet machine. Tablets conforming to the British Pharmacopoeia standards of hardness, fragility, distintegration and uniformity of weight were obtained.

Substantially similar results were obtained using a conventional rotary tablet machine (Manesty B3B) or a high-speed rotary tablet machine (Manesty Betapress).

A trial in human volunteers showed that tablets produced using the process of the invention gave very similar blood levels to conventionally produced wet granulated paracetamol tablets.

EXAMPLE 2

In each of the experiments whose results are given in the following Table, 50 gms of paracetamol was recrystallised from 87.5 ml of solution.

Polymer solutions were prepared by stirring a weighed amount of polymer into the required volume of water or water/ethanol in a beaker, with warming of necessary. The pure paracetamol was added and the mixture heated with continuous stirring until all the paracetamol had dissolved. The solution was cooled rapidly in a large volume of water, while stirring manually until deposition of solid material was almost complete. The beaker was allowed to stand in a refrigerator for an hour.

The product was recovered on a Buchnerfunnel using a small amount of water (25 ml) for washing. The mass was spread out over a filter paper and dried at 100°C for from 1 to 2 hours until it appeared to be dry. Lumps were removed by passage through a 16 mesh sieve and the granules stored in stoppered jars.

The resulting product was tested for tabletting potential on a hand-operated single-punch machine fitted with a half-inch bevelled punch. The machine was adjusted to produce the best possible tablets having dimensions something like those of commercial paracetamol tablets. Tablets were examined to evaluate binding and lamination characteristics. Results are given in Table I below, in which comments on the paracetamol crystals are also included.

GAF S 630. All experiments were carried out in 5 liter round bottomed, flange-topped reaction vessels except for 6 below where a stainless steel bucket was used. In all crystallisations, the basic ingredients remained constant:

| Polymer (GAF S 630) | 30 g |
| Paracetamol | 1000 g |
| Water | 2166 ml |
| Hydros | 300 mg | a. The polymer was dispersed in 166 ml of cold water and then diluted with a further 2000 ml of water. Heat was supplied to bring the temperature to 98°C (28 min). before the paracetamol and hydros were added. The mixture was heated to 98°C and then the source of heat was removed. Crystallisation was effected by air cooling for about 45 minutes with manual stirring followed by immersion of the vessel in an ice bath for 30 minutes to bring the temperature down to 25°C. Manual stirring was continued. The crystalline mass was recovered by centrifugation, and tray dried at 60°C.

EXAMPLE 4 b. This example is similar to (a) except that the polymer solution was heated very much more rapidly to 98°C by using a steam pan. The polymer was dissolved in 166 ml water and diluted with a further 2000 ml. This solution was boiled in a steam pan (1 to 2 minutes) before the paracetamol and hydros were added. The mixture was stirred manually to achieve complete solution, and the solution was transferred to a stainless steel bucket. Manual stirring was continued for 10 minutes until crystallisation was well advanced, and the bucket was then placed in a large volume of cold water. After a further hour the material was filtered, and the solid dried in an oven at 60°C.

c. A hot (98°C) solution of paracetamol and hydros in 1900 ml of water was added to a cold solution of the polymer. The mixture was reheated to 98°C (approximately 10 minutes) and crystallisation and separation were then conducted as in (a).

d. This was a repeat of (c), except that stirring was effected mechanically by means of a propeller stirrer.

e. This was a repeat of (c), except that the rate of cooling was much slower.

Table 1

| Polymer | | % wt. of Paracetamol | Polymer solution (Aqueous/ aqueous-alcoholic) | Binding | Lamination | Comments and nature of crystals |
| --- | --- | --- | --- | --- | --- | --- |
| None | | — | — | None | — | Large crystals |
| Polyvinyl acetate | | 2 | aqueous | some | some | Insoluble polymer |
| | | 5 | aqueous | some | some | silky-crystal- |
| | | 2 | aqueous-alcoholic | some | slight | difficult to filter |
| | | 2 | aqueous | good | some | Small crystals |
| PVP (Kollidon Bayer) | | 3.5 | aqueous | some | some | Poor flow |
| | | 5 | aqueous | good | slight | properties |
| | K30 | 5 | aqueous | some | some | |
| PVP | K60 | 5 | aqueous | some | some | |
| (GAF) | K90 | 5 | aqueous | some | some | |
| | I635 | 2 | aqueous-alcoholic | good | slight | |
| PVP/VA | I635 | 3 | aqueous-alcoholic | good | very little | Fine crystals |
| (GAF) | I635 | 5 | aqueous-alcoholic | good | very little | |
| | 1735 → | 5 | aqueous-alcoholic | good | some | |
| | I535 → | 3 | aqueous-alcoholic | good | slight | |

EXAMPLE 3

In this comparative example, the polymer used was again a 60/40 vinyl pyrrolidone/vinyl acetate copolymer sold by GAF Corporation with the Trade Name f. This was a repeat of (c), except that the polymer was added to the hot paracetamol solution (as would normally be done in commercial operation).

The results of these six experiments are set out in Table II below. In this table the assessment of tablet properties as "satisfactory" indicates that these tablets were considered acceptable from the viewpoint of commercial production. "Good" is better than satisfactory.

Hydros is an antioxidant (sodium dithionite) which is added to prevent any tendency for the paracetamol to oxidise, since this results in a product that is coloured pink.

Table II

|  | a) | b) | c) | d) | e) | f) |
|---|---|---|---|---|---|---|
| Rate of cooling (98°C–25°C) | (75 min) | (40 min) | (75 min) | (150 min) | (300 min) | (60 min) |
| Stirring | manual | manual | manual | propeller | manual | manual |
| Solid Product Moisture content after drying (% by weight) | 0.5 | 0.4 | 0.7 | 1.3 | 0.5 | 0.7 |
| Polymer content (% by weight) | 2.5 | 2.2 | 2.5 | 2.1 | 2.6 | 2.8 |
| Compression characteristics | very poor | good | good | very poor | satisfactory | satisfactory |
| Tablets Physical appearance | satisfactory | good | good | poor | good | satisfactory |
| Hardness |  |  |  |  | good | satisfactory |
| Overall rating |  |  |  |  | satisfactory | satisfactory |

As a comparison of the results of experiments (a) and (b) will show, the polymer solution in experiment (a) was apparently heated so slowly as to spoil the compression characteristics of the solid product.

EXAMPLE 5

A hot solution (98°C) of 1000 g of paracetamol and 300 mg of hydros was added to a cold aqueous solution of various polymers (30 g in 166 ml. of water), in a 5 liter round-bottomed flange-topped reaction vessel, and the mixture reheated to 98°C (about 10 minutes) and then allowed to cool. Crystallisation was effected by air cooling for about 45 minutes with manual stirring followed by immersion of the vessel in an ice bath for 30 minutes to bring the temperature down to 25°C. Manual stirring was continued. The crystalline mass was recovered by centrifugation, and tray dried at 60°C. The results are summarised in Table III.

Table III

| Polymer | Luviskol VA64 | I535 |
|---|---|---|
| Rate of cooling (98°C–25°C) | 80 | 90 |
| Solid product Moisture content (% by weight) | 0.7 | 0.6 |
| Polymer content (% by weight) | 2.4 | 2.9 |
| Compression characteristics | satisfactory | satisfactory |
| Tablets Physical appearance | good | satisfactory |
| Hardness | good | satisfactory |
| Overall rating | satisfactory | satisfactory |

EXAMPLE 6

This example illustrates the use of a mechanical paddle-type stirrer in a larger scale operation.

The experiment was carried out on a Giusti 40 liter stainless steel vessel fitted with an anchor stirrer and scrapers with baffles. The stirrer speed was kept at speed 2 (very slow) forward drive throughout the procedure. The vessel was jacketed to accomodate steam or cold water as necessary.

| Basic ingredients | |
|---|---|
| Polymer (GAF S 630) | 360 g |
| Paracetamol | 12 K |
| Water | 26 L |
| Hydros | 3.6 g |

Procedure

To a hot (98°C) solution of paracetamol and hydros in 24 l. water was added a cold solution of polymer (360 g in 2.1 of water) from a beaker. Heating and stirring were continued until total solution reheated (98°C) and then the heat was removed by turning off the steam supply. Crystallisation was effected by air cooling with stirring (98°–25°C in 5 h).

| Tabletting assessment | | |
|---|---|---|
| Solid | Compression characteristics | satisfactory |
| Tablets | Physical appearance | satisfactory |
| Tablets | Hardness | good |
|  | Overall rating | satisfactory |

The following Table IV gives details of polymers identified in the Examples by their Trade Names. The K value quoted for each is determined by Fikentscher's formula and is a function of the average molecular weight.

Table IV

Nature of PVP and PVP/VA Polymers used

| Polymer code | Supplier | VP:VA ratio | K value | Form |
|---|---|---|---|---|
| S630 | GAF | 60:40 | 30–50 | >95% solid |
| Luviskol VA 64 | BASF | 60:40 | 28–40 | >95% solid |
| I735 | GAF | 70:30 | 30–40 | 50% solution, isopropanol |
| E635 | GAF | 60:40 | 30–50 | 50% solution, ethanol |
| I535 | GAF | 50:50 | 25–35 | 50% solution, isopropanol |
| K15 | GAF | 100:0 | 15–21 | >95% solid |
| K30 | GAF | 100:0 | 26–35 | >95% solid |
| K60 | GAF | 100:0 | 50–60 | >45% solution, water |
| K90 | GAF | 100:0 | 80–100 | >95% solid |

What we claim is:

1. A composition which is suitable for direct tablet compression and which comprises a solid fine crystalline paracetamol polymer complex, said polymer selected from homopolymers and copolymers of vinyl acetate and vinyl pyrrolidone, the polymer being present in an amount of from 1 to 15%, by weight on the weight of the paracetamol, and being distributed throughout each crystal associated as said complex.

2. A composition as claimed in claim 1, wherein the polymer is present in an amount of from 1.5 to 5% by weight on the weight of the paracetamol.

3. A composition as claimed in claim 2, wherein the polymer is a copolymer of vinyl pyrrolidone and vinyl acetate in a weight ratio of from 70:30 to 50:50.

4. A composition as claimed in claim 3 having a moisture content of from 0.4 to 1.4% by weight.

* * * * *